US007888838B2

(12) United States Patent
Esenwein

(10) Patent No.: US 7,888,838 B2
(45) Date of Patent: Feb. 15, 2011

(54) ELECTRICAL DEVICE COMPRISING A CARBON BRUSH SHAPE ADAPTING DEVICE

(75) Inventor: Florian Esenwein, Uhingen-Holzhausen (DE)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 11/877,755

(22) Filed: Oct. 24, 2007

(65) Prior Publication Data

US 2008/0100153 A1 May 1, 2008

(30) Foreign Application Priority Data

Oct. 27, 2006 (DE) ...................... 10 2006 050 817

(51) Int. Cl.
*H02K 13/00* (2006.01)
*H01R 39/18* (2006.01)
*H01R 39/56* (2006.01)

(52) U.S. Cl. ...................... 310/248; 310/219; 310/220; 310/228; 310/50; 451/418

(58) Field of Classification Search ................ 310/238, 310/248, 228, 50, 219, 220, 239, 242, 245, 310/246, 247; 314/130; 451/344, 415, 418; 29/28; 30/138, 455; *H02K 13/00, 7/14; H01R 39/38, H01R 39/56, 39/18; H05B 31/18; B24B 19/00*

See application file for complete search history.

(56) References Cited

U.S. PATENT DOCUMENTS

| | | | | | |
|---|---|---|---|---|---|
| 1,049,605 | A * | 1/1913 | Ross | .......................... | 451/415 |
| 1,395,880 | A * | 11/1921 | Ward | .......................... | 451/418 |
| 1,614,005 | A * | 1/1927 | Lewis | .......................... | 451/418 |
| 2,481,499 | A * | 9/1949 | Collura | .......................... | 310/246 |
| 3,040,484 | A * | 6/1962 | Pierceall | .......................... | 451/236 |
| 3,105,331 | A * | 10/1963 | Reardon et al. | ............... | 451/28 |
| 3,430,084 | A * | 2/1969 | Hall et al. | ..................... | 310/50 |
| 3,599,302 | A * | 8/1971 | Dudek | .......................... | 29/36 |
| 4,007,562 | A * | 2/1977 | Egashira | ..................... | 451/418 |
| 4,266,155 | A * | 5/1981 | Niemela | ..................... | 310/239 |
| 5,091,067 | A * | 2/1992 | Ushiyama et al. | ........... | 205/654 |
| 6,068,926 | A * | 5/2000 | Sperling et al. | ............. | 310/228 |
| 2006/0157154 | A1* | 7/2006 | Schwaiger et al. | ............ | 144/75 |

* cited by examiner

*Primary Examiner*—Quyen Leung
*Assistant Examiner*—Michael Andrews
(74) *Attorney, Agent, or Firm*—Michael J. Striker

(57) ABSTRACT

In an electrical device, in particular a power tool, equipped with a commutator motor, and in an accessory for an electrical device of this kind, a carbon brush shape adapting device is an integral component of the electrical device or of the accessory.

12 Claims, 3 Drawing Sheets

ELECTRICAL DEVICE COMPRISING A CARBON BRUSH SHAPE ADAPTING DEVICE

CROSS-REFERENCE TO A RELATED APPLICATION

The invention described and claimed hereinbelow is also described in German Patent Application DE 10 2006 050 817.3 filed on Oct. 27, 2006. This German Patent Application, whose subject matter is incorporated here by reference, provides the basis for a claim of priority of invention under 35 U.S.C. 119(a)-(d).

BACKGROUND OF THE INVENTION

The invention relates to an electrical device, in particular a power tool, equipped with a commutator motor, and also relates to an accessory for an electrical device.

In electric generators with commutator motors (universal or direct current motors), the commutator transmits current to the armature winding of the electric motor. To this end, carbon brushes slide with a certain contact pressure over the laminated contact roller of the commutator, which is connected to the armature shaft of the electric motor and whose plates are electrically insulated from one another and are non-rotatably connected to the armature shaft.

The carbon brushes and commutator used experience wear due the constant friction. Over time, this leads to a narrowing of the commutator that becomes more pronounced as time goes on. As a rule, it is not easily possible to replace the commutator since it is affixed to the armature shaft; by contrast, it is generally easy to replace carbon brushes, particularly in high-quality electrical devices.

In the optimum case, the replacement carbon brushes are provided with a lateral beveling or rounding so that a contact between the replacement carbon brushes and the narrowed commutator over the greatest possible area is achieved in the shortest possible break-in period. However, carbon brushes without a corresponding contouring are also available on the market. If such replacement carbon brushes are used, as a rule, only very small, usually linear, contact surfaces are produced between the replacement carbon brushes and the commutator. This results in a very high local energy density since all of the current must flow through the small carbon contact surfaces. This in turn results in a highly elevated local temperature, which can have negative consequences for the service life of the commutator and carbon brushes. In addition to the high energy density, the minimal contact surfaces also result in a high mechanical stress. In particular, the laminated commutator grinds away a very large quantity of carbon from the carbon brushes within a very short time, which generates an increased amount of carbon dust. Among other places, this carbon dust collects between the plates of the collector, which can produce an electrical bridge between the plates and therefore lead to a failure of the electrical device.

SUMMARY OF THE INVENTION

The object of the invention, therefore, is to propose an electrical device, preferably a power tool, and an accessory for an electrical device, which, in a simple way, permit even carbon brushes that are not optimally formed when purchased to be used as replacement carbon brushes.

In keeping with these objects and with others which will become apparent hereinafter, one feature of the present invention resides, briefly stated, in an electrical device, comprising a commutator motor; a carbon brush, and a carbon brush shape adapting device which is configured as an integral component of the electrical device.

Another feature of the present invention resides, briefly stated, in an accessory for an electrical device, comprising a commutator motor; a carbon brush; and a carbon brush shape adapting device configured as an integral component of the accessory.

The scope of the present invention also includes all combinations of at least two of the defining characteristics disclosed in the description, the claims, or in conjunction with the drawings.

The present invention is based on the concept of providing the electrical device or an accessory of the electrical device, such as a protective casing, with a device for adapting the shape of the carbon brushes, in particular manually. With a device of this kind, which, according to the present invention, is an integral component of the electrical device or of the accessory, it is possible for the user to produce a beveling or rounding on any carbon brush so that its break-in period is significantly improved, which in turn extends the service life of the entire electrical device. The simple fact that a carbon brush shape adapting device is integrated directly into the electrical device or an accessory induces the user to adapt the shape of a replacement carbon brush because it is no longer necessary to resort to using a separate tool that is generally not readily available. Preferably, the electrical device or accessory is provided with a pictogram to alert the user to the presence of the carbon brush shape adapting device.

In its simplest embodiment, the carbon brush shape adapting device is composed of a grinding device, in particular a rough surface region that is suitable for grinding or rasping carbon brushes. The rough surface can be implemented in the form of a component additionally integrated into the electrical device or accessory or can also be implemented by adapting the surface structure of already existing components.

In a particularly preferable embodiment, the carbon brush shape adapting device—which is preferably embodied in the form of a grinding device—is mounted on a housing part of the power tool since this makes it is easily accessible and easy to use.

The adaptation of the surface structure of the power tool or of a region of the surface structure of a region of an accessory can be implemented, for example, through insertion of the desired structure, particularly into plastic components. The structure can be inserted by means of stamping or hot-stamping. In addition or alternatively, the desired structure can be stamped, pressed, or knurled into the surface. It is also conceivable to use other mechanical processes such as milling or grinding. The surface can also be structured by chemical means or through the use of a laser.

According to a particularly preferred embodiment of the invention, the rough surface region is embodied so that when a carbon brush to be adapted is stroked along it, in particular several times, this automatically yields an optimum carbon brush shape. Preferably, the shape of the rough surface region is congruent to the desired carbon brush shape.

Providing a guide further facilitates the production of the desired carbon brush shape.

In one embodiment of the invention, in order to implement the rough surface region (grinding device), it is possible to provide at least one piece of grinding paper or sandpaper mounted on the electrical device. It is likewise conceivable to melt the surface of a device component or accessory component and to fix abrasive grinding particles into it, which bond with the melted surface. Another method is to scatter heated abrasive grinding particles onto the desired surface, thus producing a fixed bond between the grinding particles and the surface.

In addition or alternatively, the rough surface region can be comprised of a file attached to the electrical device, particularly in an extendable and/or pivotable fashion or can be comprised of a rasping plate attached to the electrical device or an accessory, particularly in an extendable and/or pivotable fashion.

In a modification of the invention, the carbon brush shape adapting device is advantageously adapted to the design of the electrical device or accessory. This can occur, for example, in that the carbon brush shape adapting device is situated in the vicinity of ventilation slots, for example extending parallel to them, and therefore does not negatively influence the appearance of the electrical device.

According to a particularly preferred embodiment of the invention, a cylindrical, hollow body region on the electrical device or accessory is provided as the carbon brush shape adapting device; the at least partially hollow body is inwardly beveled in the end region so that rotating a block-shaped carbon brush along the grinding bevel yields a carbon brush that tapers conically at least over parts of its circumference and whose break-in behavior is significantly improved over that of a purely block-shaped carbon brush due to the fact that its shape is adapted to the narrowed commutator.

Other advantages, defining characteristics, and details of the invention ensue from the following description, preferred exemplary embodiments, and drawings.

DESCRIPTION OF THE PREFERRED EMBODIMENTS

Figure 1:
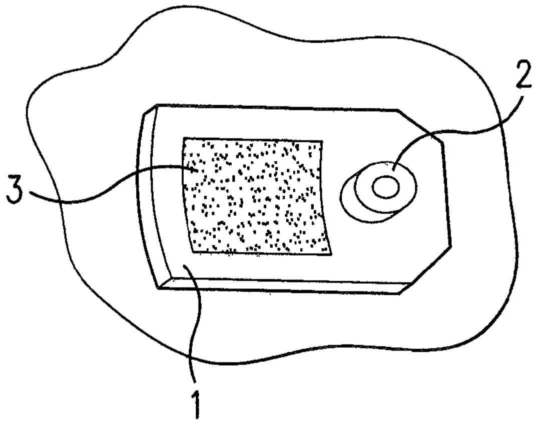
FIG. 1 shows a housing part of an electrical device equipped with a carbon brush shape adapting device that is embodied in the form of sandpaper.

In the drawings, parts that are the same and parts with the same function are labeled with the same reference numerals.

As an example of a housing part 1 of a power tool, FIGS. 1 through 6 show a brush cover, which can be attached in pivoting fashion to an electrical device by means of a screw arbor 2. After the brush cover is pivoted, carbon brushes situated underneath it can be easily replaced. In lieu of a brush cover, any other easily accessible electrical device component can be used for integrally accommodating the carbon brush shape adapting device 3, which is embodied as sandpaper in FIG. 1. The integration of the carbon brush shape adapting device 3 into an accessory, for example a dual-socket wrench, a protective cover, or an auxiliary handle, is not shown for the sake of clarity.

As mentioned above, the carbon brush shape adapting device in the exemplary embodiment according to FIG. 1 is embodied in the form of sandpaper mounted on the housing part 1.

Figure 2:
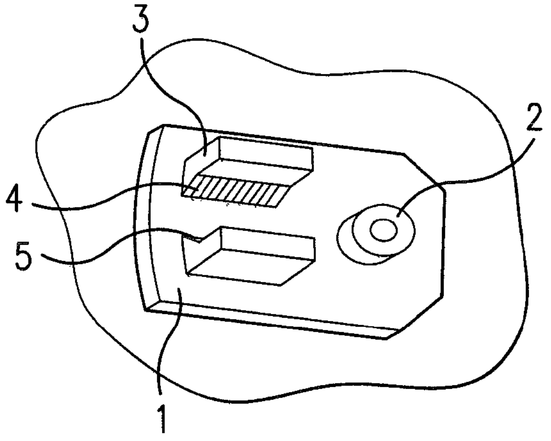
FIG. 2 shows a housing part of an electrical device equipped with a carbon brush shape adapting device that is embodied with a shape that is congruent to the desired brush shape.

In the exemplary embodiment according to FIG. 2, the carbon brush shape adapting device 3 has two walls 4, 5 spaced apart from each other, which, at their lower ends, i.e. the ends oriented toward the housing part 1, are embodied in the form of rasps and widen out toward each other. If a carbon brush, not shown, is slid several times between the two parallel walls, parallel to the housing part 1, with a slight pressure oriented toward the housing part 1, this causes the carbon brush to be beveled on two sides until the shape of the carbon brush is congruent in shape to the volume enclosed by the walls 4.

Figure 3:
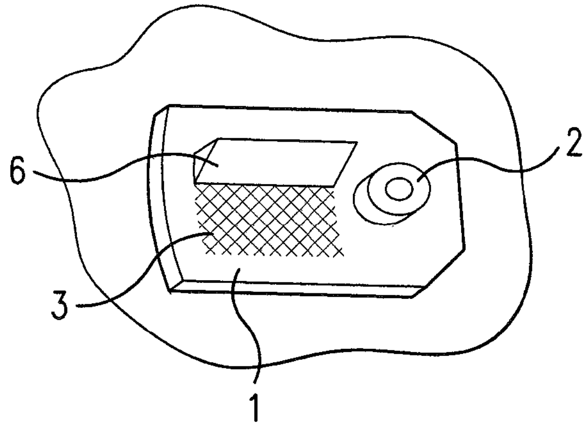
FIG. 3 shows a housing part of an electrical device equipped with a roughened surface region with a guide.

In the exemplary embodiment according to FIG. 3, the carbon brush shape adapting device is embodied in the form of a rough structure that is stamped into the housing part 1 and is delimited on one side by a longitudinal guide 6, which has a guide surface that is inclined in relation to the surface of the housing part. If the carbon brush is moved along the guide 6, then it is beveled at an optimum angle.

Figure 4:
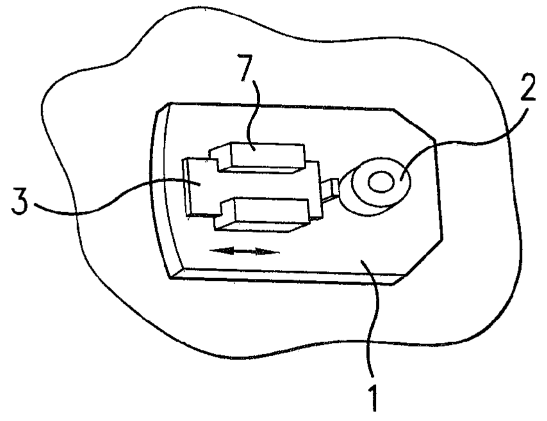
FIG. 4 shows a housing part of an electrical device equipped with a carbon brush shape adapting device that is embodied in the form of an extendable file.

In the exemplary embodiment according to FIG. 4, the carbon brush shape adapting device is embodied in the form of a file, which is attached to the housing part 1 in an extendable fashion. To this end, a housing 7 is provided, which the carbon brush shape adapting device 3 can be slid back into after use and thus does not hinder operation of the electrical device.

Figure 5:
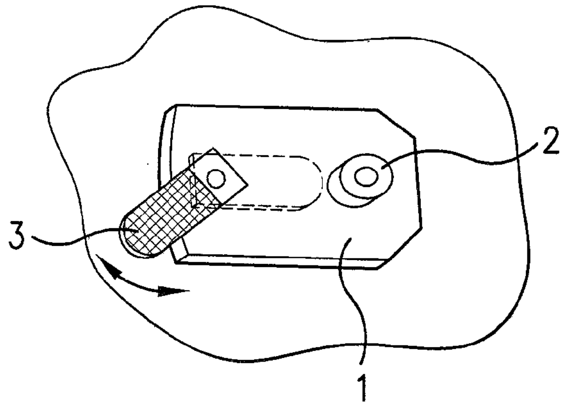
FIG. 5 shows a housing part of an electrical device equipped with a carbon brush shape adapting device that is embodied in the form of a pivotable file.

In the exemplary embodiment according to FIG. 5, the carbon brush shape adapting device 3, which is likewise embodied in the form of a file, is supported on the housing part 1 in a way that allows it to pivot in a plane parallel to the housing part 1.

Figure 6:
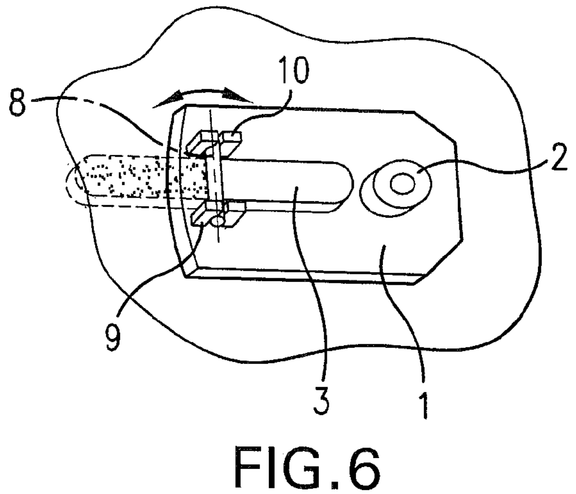
FIG. 6 shows an embodiment similar to the embodiment shown in FIG. 5, in which the file can be folded out.

In the exemplary embodiment according to FIG. 6, a folding mechanism is provided that permits the carbon brush shape adapting device 3, which is likewise embodied in the form of arrows, to pivot between the deployed position depicted with dashed lines and a storage position. To allow the carbon brush shape adapting device 3 to pivot, a pivot axle 8 is provided, which extends parallel to the housing part 1 and is supported in pivoting fashion in two pivot bearings 9, 10 on opposite sides.

Figure 7:
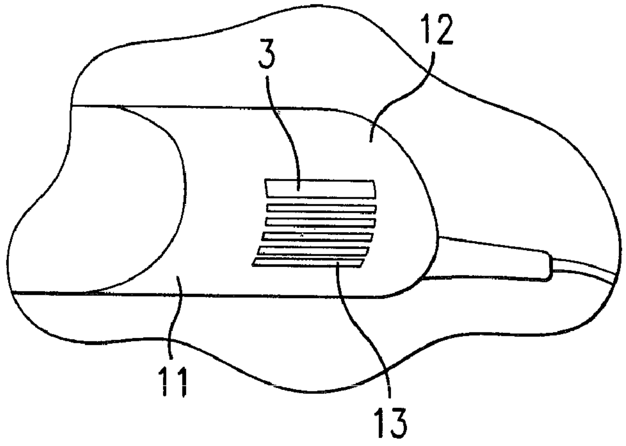
FIG. 7 shows a housing part of an electrical device equipped with a carbon brush shape adapting device that is situated in the region of ventilation slots.

The exemplary embodiment according to FIG. 7 shows a detail of an electrical device 11 (hand-guided power tool). The housing of the electrical device 11 is provided with parallel ventilation slots 13 and the carbon brush shape adapting device 3, which is embodied in the form of a rasp, is situated parallel to these slots and is thus optimally adapted to the design of the electrical device 11. It is also conceivable to arrange a plurality of carbon brush shape adapting devices 3, preferably in the form of rasps, in particular parallel to the ventilation slots. The rasps can have different grinding radii in order to be able to adapt the replacement carbon brushes to different wear states.

Figure 8:
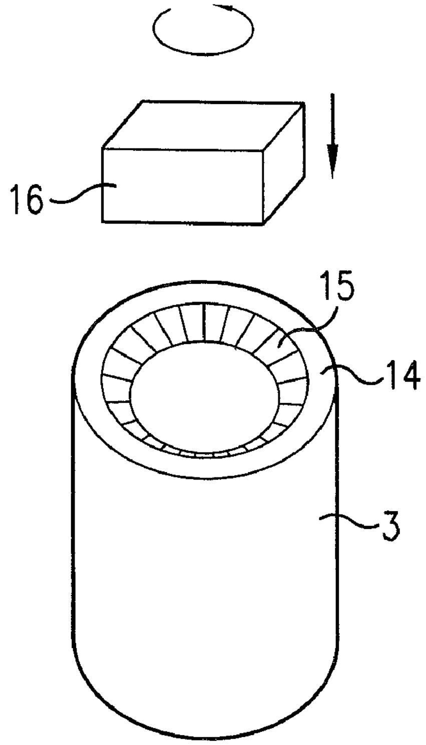
FIG. 8 is a separate depiction of a carbon brush shape adapting device that is embodied in the form of a hollow body with a beveled rim region on its end surface.

The exemplary embodiment according to FIG. 8 shows a carbon brush shape adapting device 3 in the form of a cylindrical, hollow body, detached from an electrical device. On the upper annular end surface 14 in the plane of the drawing, an inwardly beveled grinding ring region 15 with a rough surface is provided. If the schematically depicted carbon brush 16 is rotated while a force is exerted on it in the direction toward the carbon brush shape adapting device 3, then the carbon brush 16 is beveled in a definite fashion, thus significantly improving its break-in properties.

It will be understood that each of the elements described above, or two or more together, may also find a useful application in other types of constructions differing from the type described above.

While the invention has been illustrated and described as embodied in an electrical device and accessory for an electrical device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electrical device arranged in a housing, comprising:

a commutator motor;

a carbon brush; and a carbon brush shape adapting device which is configured as a grinding device with a rough surface region and as congruent in shape to a desired shape of said carbon brush, the grinding device formed integrally with the electrical device to extend from a surface of the housing in a non-detachable manner, wherein said rough surface region comprises either a file plate or a rasp plate permanently attached to the integral grinding device.

2. An electrical device as defined in claim 1, wherein the electrical device is configured as a power tool.

3. An electrical device as defined in claim 1, and further comprising at least one guide configured for guiding a stroking motion against said rough surface region.

4. An electrical device as defined in claim 1, wherein said rough surface region of said grinding device comprises a grinding paper permanently affixed to the grinding device.

5. An electrical device as defined in claim 1, wherein said carbon brush shape adapting device is configured as a cylindrical, hollow body with an annular grinding bevel provided at one end.

6. An electrical device as defined in claim 1, wherein said carbon brush shape adapting device is situated in a vicinity of ventilation slots.

7. An electrical device as defined in claim 6, wherein said carbon brush shape adapting device extends parallel to said ventilation slots.

8. An accessory for an electrical device, the electrical device comprising a commutator motor and a carbon brush arranged in a housing, wherein the accessory comprises a carbon brush shape adapting device which is configured as a grinding device with a rough surface region and as congruent in shape to a desired shape of said carbon brush, wherein said grinding device is an integral component of the accessory that extends from a surface of the housing in a non detachable manner and comprises either a file plate or a rasp plate permanently attached to the integral grinding device.

9. An accessory as defined in claim 8, wherein the accessory is configured as an accessory for a power tool.

10. An electrical device as defined in claim 1, wherein said grinding device comprises abrasive particles embedded into regions of a surface of an electrical device component that is integral with the electrical device, said abrasive particles comprising said rough surface.

11. An electrical device as defined in claim 1, wherein said grinding device extends pivotably from the surface of the housing.

12. An accessory as defined in claim 8, wherein said grinding device extends pivotably from the surface of the housing.

* * * * *